Dec. 12, 1961   L. I. GORMAN ET AL   3,013,109
ELECTRIC CABLE
Filed March 16, 1961

INVENTORS
LEO I. GORMAN
JOSEPH W. FAULKNER
BY
*Victor F. Volk*
THEIR AGENT

United States Patent Office 3,013,109
Patented Dec. 12, 1961

3,013,109
ELECTRIC CABLE
Leo I. Gorman, Dallas, Tex., and Joseph W. Faulkner, Sweetser, Ind., assignors to Anaconda Wire and Cable Company
Filed Mar. 16, 1961, Ser. No. 96,638
5 Claims. (Cl. 174—113)

Our invention relates to electric cables and particularly to protective-sheathed power cables having a novel type of sheathing material.

This application is a continuation-in-part of our co-pending application, Serial #28,978, filed May 13, 1960, now abandoned.

In the manufacture of certain commonly used types of electric cable, for example, non-metallic sheathed cable for building wiring, it has long been commercial practice to apply two different types of material covering, one for insulation and other for protective sheathing. The insulation is applied directly over the cable conductors with the possible interposition of a thin separator or semiconducting tape, and has as its function the electrical isolation of the conductor. The function of electrical isolation has determined that the properties of materials suitable for insulation be, among others, high insulation resistance, and, for high voltage and communication cables, low specific inductive capacitance.

The protective sheath, as distinguished from the insulation, is applied over one or more conductors which have previously been insulated, and its function, almost exclusively physical rather than electrical, is to protect the insulated conductors from the external environment. For this reason the characteristics required of a sheathing material have traditionally been abrasion resistance, high strength, and toughness. Non-metallic protective sheaths have commonly been reinforced with fabric and have employed materials such as Neoprene which has poor electrical properties but outstanding toughness and strength.

It is an object of our invention to provide a rugged electric cable having low cost and low weight.

It is a further object of our invention to provide a cable, comparable in cost and ruggedness to cable having a braided or other tough fibrous sheath, but free from bituminous coating material.

It is a further object of our invention to provide a cable that is readily bendable, particularly in the plane of the conductors.

Other objects will become apparent from a study of the details of our invention hereinafter described.

Returning to consideration of materials suitable for electrical insulation, it is known that air has very high insulation resistance and low SIC at voltage stresses insufficient to cause ionization. For this reason expanded cellular plastics have found employment as insulation, particularly for low-voltage, high-frequency cables such as TV lead-in cables where a low SIC is the most important desideratum. Where such cables have required mechanical protection they have been surrounded by protective sheaths of the usual tough, dense compositions mentioned above.

Methods of applying cellular plastic insulation are known. These methods involve including in the plastic material a solid blowing agent which will decompose at some predetermined temperature to generate bubbles of gas within the plastic mass. If the decomposition temperature is reached while the plastic is confined under high pressure the released gas will remain compressed until the pressure is lowered, at which time, if the plastic is still hot and soft enough, expansion of the gas will take place to form a cellular structure of bubbles within the plastic. Known blowing agents for the release of gas in expandable plastic material include p,p′-oxybis (benzenesulfonyl hydrazide), N,N′-dimethyl-N,N′-dinitrosoterephthalamide, and azocarbonamide.

Among the types of electric cable recognized by the National Electrical Code are type NM and type NMC used for wiring buildings for service at 110 volts in locations where local codes do not require that the wiring be confined in conduits. The cable may be secured by staples and, during its installation, fished through walls. In this process of installation, the cable will scrape against the rough edges of lumber and against other harsh surfaces that demand a rugged cable covering. The most widely used present construction of type NM cable employs parallel conductors, polyvinyl chloride insulation, a paper tape wrap over the insulated conductors, fibrous braid over the tape wrap, asphalt saturant, and an over-all light-colored paint finish. In an alternative construction a solid polyvinyl chloride jacket is substituted for all the cable elements external to the polyvinyl chloride insulation, with a fiberglass serving over the insulated conductors to provide slippage. However the cost of polyvinyl chloride is relatively high so that the braid and asphalt construction still dominates the market for type NM cable.

For many years it has been standard practice to subject types NM and NMC cable to a joist test. In this test eight boards of lumber, each of 2-inch nominal thickness, are spaced 16 inches apart in a frame. Holes ⅝-inch in diameter are drilled in each of the boards with the holes in alternate boards offset a distance of 2 inches. One end of a length of the cable to be tested is threaded through the holes and then the entire length is pulled through by means of tension of the leading end. Since the holes are alternately off center the cable is dragged in a zigzag path and subjected to severe scraping at the edge of each of the eight holes. A fibrous braided or solid polyvinyl chloride sheath has heretofore been deemed necessary to adequately protect the cable under such conditions. However, when the braided, asphalt-saturated construction of type NM cable is pulled through the joist testing equipment described above there is a tendency for the paint and/or asphalt coating to scrape off at the sharp edges of the holes, with some consequent impairment of its protective qualities.

Known cables for NM service have required an intermediate layer between the insulation and the sheath to provide adequate slippage. In the case of saturated braid cables this layer has usually been paper, and in the case of solid plastic sheathed cables it has consisted of a glass fiber serving or a film of Mylar polyester manufactured by E. I. du Pont de Nemours & Co., Inc. The use of oily or powdery lubricants has not been adequate to provide permanent slippage between the insulation and the sheath of conventional cables.

We have made the surprising discovery that expanded cellular organic material, similar to the material known to the prior cable art only for high frequency insulation, can be advantageously used to form the protective sheath of electric cables.

The cables made in accordance with our invention were unexpectedly found to be bendable without distortion and after being deliberately bent at a selected angle to maintain their bent shape indefinitely. It was possible not only to make acceptable bends in the cables across the plane of the conductors but to make flat (or edgewise) bends within the plane of the conductors. It will be readily recognized that such bendability has a particular merit in cables intended for permanent installation within the walls and around the joists and corners of frame buildings. The unexpected bendability of cables made to the teachings of this invention may be due in part to the relatively low frictional resistance between the dense semirigid polyvinyl chloride insulation and the expanded cellular jacket, and indeed it has been discovered that the insulated conductors do, in fact, slip within the jacket when the cables of this invention are subjected to bending. The compressibility of the gas pockets in the jacket is also a probably contributing source of the bendability of these cables permitting said jackets to contract on the concave surface of the bends. A cable construction made to the teachings of our invention will comprise a plurality of metallic conductors each covered with dense solid insulation, and an outer protective sheath over-all, the sheath characteristically being composed essentially of a tough, flexible resinous plastic material such as polyvinyl chloride in expanded cellular form. The sheath is distinct from the insulation and is slippable or slidable thereon with the result that the cable can be readily bent without distortion. Thus we have made a flat cable for type NM and NMC service having parallel conductors insulated with extruded solid polyvinyl chloride, laid parallel, sheathed with a protective sheath of expanded cellular polyvinyl chloride and readily bendable in the plane of the conductors without warping. Preferably, the density of the expanded cellular plastic sheath material is in the range from 50% to 75% of that the same plastic material in dense non-cellular form. We have also provided cables of the above type with dry, pulverulent lubricant between the sheath and the insulation.

Two preferred embodiments of our invention are illustrated in the accompanying drawing, wherein.

Figure 1:
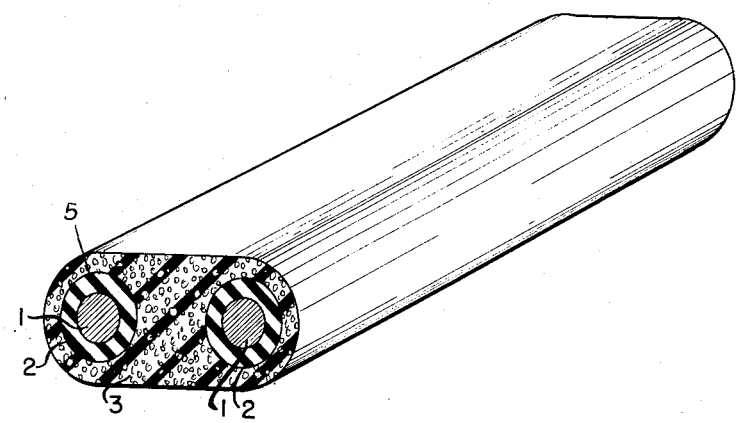
FIG. 1 is a sectionalized perspective view of a 2-conductor cable made to the teachings of this invention.

The conductors 1 shown in the drawings are solid wires of copper or aluminum, but each of the conductors 1 may if desired be composed of a plurality of relatively small wires stranded or twisted together. Each of the conductors 1 is covered with a layer of insulation 2 which is preferably of extruded semirigid polyvinyl chloride, but may be polyethylene, rubber or any other material suitable for electrical insulation, and may be applied by wrapping, by dipping or by other processes known to the cable insulating arts, instead of by extrusion.

We prefer to lubricate the insulation 2 with a coating 5 of a dry pulverulent dust such as ground silica, talc or mica powder. This may be accomplished by merely passing the insulated conductor through a box of the lubricating powder.

As shown the conductors are laid parallel and are covered with a protective sheath 3 of expanded cellular organic material which also fills the space between the insulations 2. This expanded cellular sheath may be applied to the insulated conductor by extruding it thereover similarly to the application of expanded cellular insulation to twin conductor parallel high frequency cable. For example, the two conductors 1 with their respective layers of insulation 2 may be guided through an extrusion apparatus by which the polyvinyl chloride sheath composition containing a blowing agent is extruded thereabout. As the insulated conductors surrounded by the hot sheath composition emerge from the extruder, the sheath composition is expanded by the blowing agent into its final cellular form.

By virtue of the expansion of the polyvinyl chloride into cellular form, a sheath of desired thickness over the insulated conductors and filling the space between them can be formed with a much less weight of polyvinyl chloride than if it were solid. Hence, the cost of the sheath is reduced to a value commensurate with asphalt-saturated fibrous braid construction. Yet the expanded cellular sheath provides substantially as effective mechanical protection for the cable as a solid polyvinyl chloride sheath, and even better protection than the braided asphalt-impregnated sheath.

As indicated above, the expanded cellular polyvinyl chloride (or other tough resinous plastic sheath material) has a density less than 75% of that of the same material in its dense non-cellular form, for at higher densities the economic advantages of the invention are largely lost. On the other hand, the density of the expanded cellular plastic sheath should not be less than about 50% of that of the same plastic material in dense non-cellular form, for then it becomes too foamy and fragile and loses the toughness, compression resistance and other physical properties which enable it to provide the original mechanical protection to the insulated conductors. Generally the density of the cellular expanded sheath material should be about 70% of that of the material in dense unexpanded form.

Figure 2:
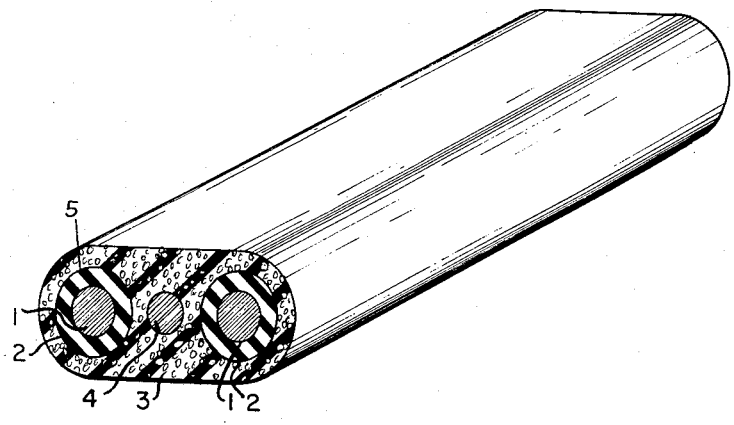
FIG. 2 is a sectionalized perspective view of a 2-conductor cable with ground return made to the teachings of this invention.

An uninsulated grounding wire 4 may be laid between the two conductors as shown in FIG. 2 in which case the space between the conductors will preferably be increased to accommodate the grounding wire.

Cables were made according to the present invention embodying the following specific constructions:

*Example I*

Conductors (2)—14 AWG hard-drawn copper
Insulation—²⁄₆₄ inch wall semirigid polyvinyl chloride dusted with ground silica [1]
Cabling—2 conductors parallel at 0.135 inch spacing
Protective sheath—expanded cellular polyvinyl chloride
Outside dimensions—.241 x .437 inch
Gas content of protective sheath—29%

*Example II*

Conductors (2)—14 AWG soft-drawn copper conductor
Conductor (grounding)—16 AWG soft drawn copper
Insulation—²⁄₆₄ inch wall semirigid polyvinyl chloride dusted with ground silica [1]
Cabling—2 conductors parallel at 0.155 inch spacing, uninsulated grounding conductor centered between the two insulated conductors
Protective sheath—expanded cellular polyvinyl chloride
Outside dimension—.228 x .446 inch
Gas content of protective sheath—27%

[1] Neo Novacite supplied by Malvern Minerals Co.

The joist pull test of the character described above was made after subjecting the cables of Examples I and II to a −20° C. temperature for 18 hours. There were no noticeable effects on the cables after the joist pulling.

Particular reference has been made herein to polyvinyl chloride insulation and expanded cellular sheath. It is understood that other resinous vinyl compositions are equally satisfactory, such as compositions employing polyvinyl acetate; and, in fact, the term "polyvinyl chloride" as used herein includes all the usual insulating and other compositions based on polyvinyl chloride and its copolymers with vinyl acetate which are employed for insulation and sheathing purposes in the electric cable industry.

We claim:

1. A sheathed electric power cable comprising a plurality of coplanar parallel metallic conductors, a solid layer of semirigid polyvinyl chloride insulation over each of said conductors, an outer continuous protective sheath completely surrounding said insulated conductors, said sheath consisting of polyvinyl chloride in expanded cellular form, said sheath being distinct from said insulation and slidable thereon whereby said cable can be readily bent in the plane of said conductors without warping.

2. A sheathed electric power cable comprising a plurality of coplanar parallel metallic conductors, a solid layer of semirigid polyvinyl chloride insulation over each of at least two of said conductors, an outer continuous protective sheath completely surrounding said conductors and said insulation, said sheath consisting of polyvinyl chloride in expanded cellular form, said sheath being distinct from said insulation and slidable thereon whereby said cable can be readily bent in the plane of said conductors without warping.

3. A sheathed electric power cable comprising a plurality of coplanar parallel metallic conductors, a solid layer of dense electrical insulation over each of at least two of said conductors, an outer continuous protective sheath completely surrounding said conductors and said insulation, said sheath consisting of polyvinyl chloride in expanded cellular form having a density in the range from 50% to 75% of that of the same polyvinyl chloride in dense non-cellular form, said sheath being distinct from said insulation and slidable thereon whereby said cable can be readily bent in the plane of said conductors without warping.

4. A sheathed electric power cable comprising a plurality of coplanar parallel metallic conductors, a solid layer of semirigid polyvinyl chloride insulation over at least two of said conductors, a dry pulverulent lubricant coating said insulation, an outer continuous protective sheath completely surrounding said conductors and said insulation, said sheath consisting of polyvinyl chloride in expanded cellular form, said sheath being distinct from said insulation and slidable thereon whereby said cable can be readily bent in the plane of said conductors without warping.

5. A sheathed electric power cable comprising a plurality of coplanar parallel metallic conductors, a solid layer of dense electrical insulation over each of said conductors, an outer continuous protective sheath completely surrounding said conductors and said insulation, said sheath consisting of polyvinyl chloride in expanded cellular form having a density in the range from 50% to 75% of that of the same polyvinyl chloride in dense non-cellular form, said sheath being distinct from said insulation and slidable thereon, whereby said cable can be readily bent in the plane of said conductors without warping.

References Cited in the file of this patent
UNITED STATES PATENTS

| | | |
|---|---|---|
| 2,186,793 | Wodtke | Jan. 9, 1940 |
| 2,718,544 | Shepp | Sept. 20, 1955 |
| 2,737,503 | Sprague et al. | Mar. 6, 1956 |
| 2,805,276 | Weitzel | Sept. 3, 1957 |

FOREIGN PATENTS

| | | |
|---|---|---|
| 742,760 | Great Britain | Jan. 4, 1956 |